US012587932B2

(12) United States Patent
Mostafa et al.

(10) Patent No.: US 12,587,932 B2
(45) Date of Patent: Mar. 24, 2026

(54) METHODS FOR ENHANCED RADIO LINK FAILURE RECOVERY

(71) Applicant: Apple Inc., Cupertino, CA (US)

(72) Inventors: Amr Mostafa, Munich (DE); Fangli Xu, Beijing (CN); Zhibin Wu, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 531 days.

(21) Appl. No.: 17/785,274

(22) PCT Filed: Sep. 24, 2021

(86) PCT No.: PCT/CN2021/120287
§ 371 (c)(1),
(2) Date: Jun. 14, 2022

(87) PCT Pub. No.: WO2023/044745
PCT Pub. Date: Mar. 30, 2023

(65) Prior Publication Data
US 2023/0276332 A1 Aug. 31, 2023

(51) Int. Cl.
*H04W 36/30* (2009.01)
*H04W 36/00* (2009.01)
(Continued)

(52) U.S. Cl.
CPC ... *H04W 36/305* (2018.08); *H04W 36/00835* (2018.08); *H04W 36/362* (2023.05); *H04W 76/20* (2018.02)

(58) Field of Classification Search
None
See application file for complete search history.

(56) References Cited

U.S. PATENT DOCUMENTS

2020/0329338 A1 10/2020 Furukawa
2020/0351731 A1* 11/2020 Kim .................. H04W 36/0079
(Continued)

FOREIGN PATENT DOCUMENTS

CN 112243595 A 1/2021
CN 116158189 5/2023
(Continued)

OTHER PUBLICATIONS

Office Action for JP Patent Application No. 2022-535514; Oct. 30, 2023.
(Continued)

*Primary Examiner* — Saad Khawar
(74) *Attorney, Agent, or Firm* — Kowert, Hood, Munyon, Rankin & Goetzel, P.C.

(57) ABSTRACT

A user equipment (UE) may establish a radio resource control (RRC) connection with a first cell of a cellular network and transmit signaling comprising an indication of enhanced radio link failure (RLF) recovery capability. The UE may receive one or more RRC messages comprising configuration information for RLF recovery on the first cell. The UE detect one or more RLFs corresponding to the first cell and further determine, via a connection reestablishment cell selection procedure, that the first cell is a suitable RLF recovery candidate cell. In response to the detection and determination, the UE may apply the configuration information for the first cell. The UE may then transmit signaling comprising a trigger indicating a RLF recovery to the cellular network and re-establish the RRC connection with the cellular network using the configuration information.

20 Claims, 11 Drawing Sheets

(51) Int. Cl.
      *H04W 36/36*          (2009.01)
      *H04W 76/20*          (2018.01)

(56)                References Cited

U.S. PATENT DOCUMENTS

| | | | |
|---|---|---|---|
| 2021/0219240 A1* | 7/2021 | Lee ........................ | H04W 76/15 |
| 2021/0258843 A1 | 8/2021 | Awada | |
| 2021/0360496 A1* | 11/2021 | Ishii .................... | H04W 36/362 |
| 2024/0015629 A1* | 1/2024 | Jia ......................... | H04W 36/08 |

FOREIGN PATENT DOCUMENTS

| | | |
|---|---|---|
| WO | 2020197214 A1 | 10/2020 |
| WO | 2020222308 A1 | 11/2020 |
| WO | 2020229552 | 11/2020 |
| WO | 2021038498 | 3/2021 |
| WO | 2021063487 A1 | 4/2021 |
| WO | 2021102879 | 6/2021 |
| WO | 2021172964 | 9/2021 |

OTHER PUBLICATIONS

Huawei "(TP for SON BLCR for 38.300) Mobility Enhancement Optimization", 3GPP TSG-RAN WG3 Meeting #112 R3-212212, May 17, 2021.

Nokia et al. "UE capabilities for Mobility Enhancement s WI", 3GPP TSG RAN WG2#110-e R2-2005160, Jun. 1, 2020.

Huawei "(TP for SON BLCR for 38.300) Mobility Enhancement Optimization", 3GPP TSG RAN WG3#110-e R3-206196, Nov. 2, 2020.

Samsung Electronics "RLM and RLF signalling structure for NR and TP for TS 38.331", 3GPP TSG RAN WG2#100 R2-1713858, Nov. 27, 2017.

ZTE Corporation et al. Discussion on the configuration of CHO candidates, 3GPP TSG RAN WG2#106 R2-1907106, May 13, 2019.

Huawei "The applicability of multiple PLMNs to MDT and RL F report", 3GPP TSG-RAN WG2#77 R2-120153, Feb. 6, 2012.

International Search Report and Written Opinion for PCT/CN2021/120287, 9 pages, Jan. 25, 2022.

Extended European Search Report for EP Patent Application No. 21899315.2; 11 pages; Oct. 21, 2022.

Ericsson "Fast handover failure recovery"; 3GPP TSG RAN WG2 #107 R2-1909342; Prague, Czech Republic; Aug. 26, 2019.

Office Action for CN 202180007222.4; May 21, 2025.

* cited by examiner

METHODS FOR ENHANCED RADIO LINK FAILURE RECOVERY

PRIORITY CLAIM

This application is a national phase entry of PCT application number PCT/CN2021/120287, entitled "Methods for Enhanced Radio Link Failure Recovery," filed Sep. 24, 2021, which is hereby incorporated by reference in its entirety as though fully and completely set forth herein. The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD

The invention relates to wireless communications, and more particularly to apparatuses, systems, and methods for enhanced radio link failure recovery.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1×RTT, 1×EV-DO, HRPD, eHRPD), IEEE 802.11 (WLAN or Wi-Fi), BLUETOOTH™, etc.

The ever-increasing number of features and functionality introduced in wireless communication devices also creates a continuous need for improvement in both wireless communications and in wireless communication devices. To increase coverage and better serve the increasing demand and range of envisioned uses of wireless communication, in addition to the communication standards mentioned above, there are further wireless communication technologies under development.

A proposed next telecommunications standard moving beyond the current International Mobile Telecommunications-Advanced (IMT-Advanced) Standards is called 5th generation mobile networks or 5th generation wireless systems, or 5G for short (otherwise known as 5G-NR for 5G New Radio, also simply referred to as NR). 5G-NR proposes a higher capacity for a higher density of mobile broadband users, also supporting device-to-device, ultra-reliable, and massive machine communications, as well as lower latency and lower battery consumption, than current LTE standards. Further, the 5G-NR standard may allow for less restrictive UE scheduling as compared to current LTE standards. Consequently, efforts are being made in ongoing developments of 5G-NR to take advantage of higher throughputs possible at higher frequencies. Accordingly, improvements in the field in support of such development and design are desired.

SUMMARY

Embodiments relate to wireless communications, and more particularly to apparatuses, systems, and methods for enhanced radio link failure recovery.

A user equipment (UE) may establish a radio resource control (RRC) connection with a first cell of a cellular network and transmit signaling comprising an indication of enhanced radio link failure (RLF) recovery capability. The UE may receive one or more RRC messages comprising configuration information for RLF recovery on the first cell. The UE detect one or more RLFs corresponding to the first cell and further determine, via a connection reestablishment cell selection procedure, that the first cell is a suitable RLF recovery candidate cell. In response to the detection and determination, the UE may apply the configuration information for the first cell. The UE may then transmit signaling comprising a trigger indicating a RLF recovery to the cellular network and re-establish the RRC connection with the cellular network using the configuration information.

In some embodiments, the first cell may include a primary cell (PCell) to which the UE was connected to prior to the one or more RLFs and the one or more candidate cells may include one or more neighboring cells. Additionally or alternatively, the signaling comprising the trigger further may comprise at least one of a reason for the enhanced RLF recovery, an identifier of the applied configuration information, a cause of the RLF, information data regarding the RLF, and/or a RLF report, among various possibilities. According to some embodiments, the signaling comprising the trigger indicating a RLF recovery may be transmitted via media access control (MAC) layer-2 (L2) signaling.

In some embodiments, upon successful reception of the trigger, user-plane data transfer between the UE and at least one of the serving cell and one or more candidate cells may be resumed. Additionally or alternatively, the configuration information may include one or more enhanced RLF recovery configurations associated with the serving cell. According to some embodiments, each of the one or more enhanced RLF recovery configurations may correspond to one or more distinct validity periods configured by the base station.

In some embodiments, the one or more candidate cells may include a primary cell (PCell) to which the UE may have been connected to prior to the one or more RLFs and may further be configured by the network as a candidate CHO cell. Additionally or alternatively, the one or more candidate cells may be configured by the network as one or more candidate CHO cells. According to some embodiments, the UE or wireless device may be configured to indicate support of an enhanced radio link failure (RLF) recovery capability via non-access stratum (NAS) signaling. Additionally or alternatively, the signaling including the trigger indicating a RLF recovery may be transmitted via dedicated RRC signaling.

According to further embodiments, the CHO configuration information may include conditional execution conditions. Additionally or alternatively, the conditional execution conditions may be configured by the base station in an Abstract Syntax Notation 1 (ASN.1) field.

In some embodiments, a base station may configure one or more validity periods corresponding to the configuration information and the base station may be configured to dynamically enable or disable the enhanced RLF recovery capability of the UE. Additionally or alternatively, the base station may be configured to indicate via System Information Broadcast (SIB) messaging whether or not the enhanced RLF capability is allowed.

The techniques described herein may be implemented in and/or used with a number of different types of devices, including but not limited to unmanned aerial vehicles (UAVs), unmanned aerial controllers (UACs), base stations, access points, cellular phones, tablet computers, wearable computing devices, portable media players, automobiles and/or motorized vehicles, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1A:
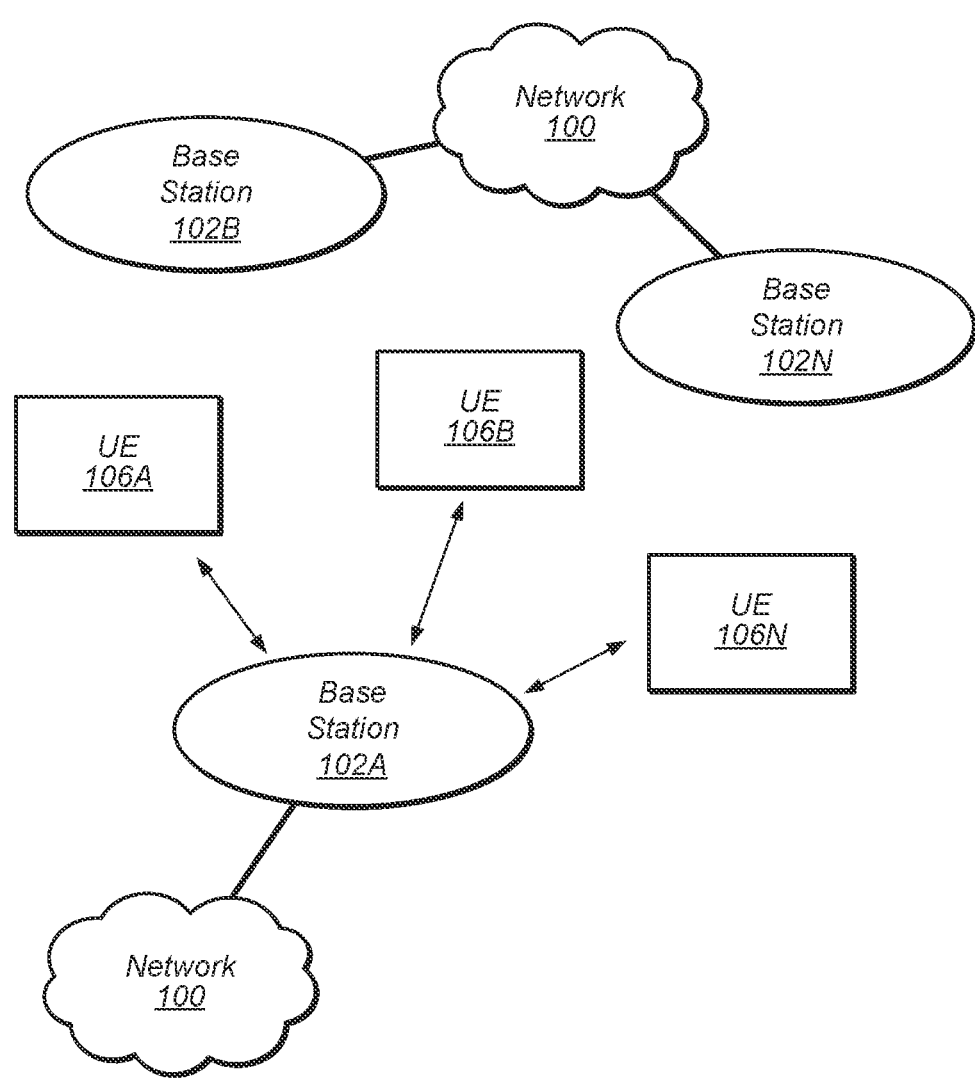
FIG. 1A illustrates an example wireless communication system according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:

3GPP: Third Generation Partnership Project
TS: Technical Specification
RAN: Radio Access Network
RAT: Radio Access Technology
UE: User Equipment
RF: Radio Frequency
BS: Base Station
DL: Downlink
UL: Uplink
LTE: Long Term Evolution
NR: New Radio
5GS: 5G System
5GMM: 5GS Mobility Management
5GC: 5G Core Network
IE: Information Element
ITS: Intelligent Transportation System
PCell: Primary Cell
SCell: Secondary Cell
RLF: Radio Link Failure
RRC: Radio Resource Control
L1: Layer 1
L2: Layer 2
MAC: Media Access Control
RLC: Radio Link Control
HO: Handover
CHO: Conditional Handover
ASN.1: Abstract Syntax Notation 1
NW: Network
NAS: Non-Access Stratum
SIB: System Information Block
PDCP: Packet Data Convergence Protocol Terms The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, other handheld devices, automobiles and/or motor vehicles, unmanned aerial vehicles (UAVs) (e.g., drones), UAV controllers (UACs), and so forth. In general, the term "UE" or "UE device" can be broadly defined to encompass any electronic, computing, and/or telecommunications device (or combination of devices) which is easily transported by (or with) a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 1B:
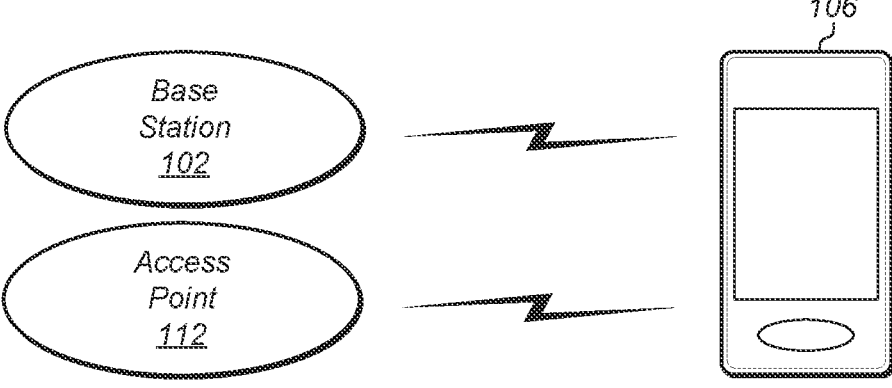
FIG. 1B illustrates an example of a base station (BS) and an access point in communication with a user equipment (UE) device according to some embodiments.

FIGS. 1A and 1B: Communication Systems

FIG. 1A illustrates a simplified example wireless communication system, according to some embodiments. It is noted that the system of FIG. 1A is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station") and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transmission and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 1B illustrates user equipment 106 (e.g., one of the devices 106A through 106N) in communication with a base station 102 and an access point 112, according to some embodiments. The UE 106 may be a device with both cellular communication capability and non-cellular communication capability (e.g., Bluetooth, Wi-Fi, and so forth) such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD), LTE/LTE-Advanced, or 5G NR using a single shared radio and/or GSM, LTE, LTE-Advanced, or 5G NR using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTT or LTE or GSM), and separate radios for communicating using each of Wi-Fi and Bluetooth. Other configurations are also possible.

Figure 2:
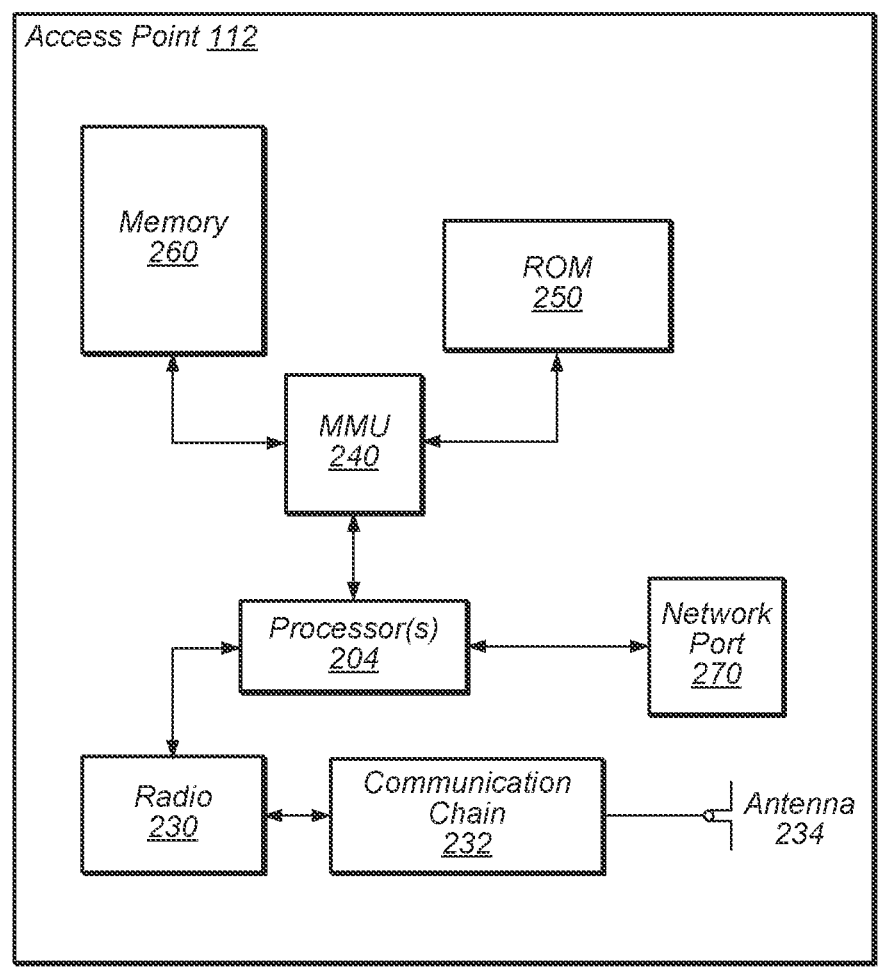
FIG. 2 illustrates an example simplified block diagram of a WLAN Access Point (AP), according to some embodiments.

FIG. 2: Access Point Block Diagram

FIG. 2 illustrates an exemplary block diagram of an access point (AP) 112. It is noted that the block diagram of the AP of FIG. 2 is only one example of a possible system. As shown, the AP 112 may include processor(s) 204 which may execute program instructions for the AP 112. The processor(s) 204 may also be coupled (directly or indirectly) to memory management unit (MMU) 240, which may be configured to receive addresses from the processor(s) 204 and to translate those addresses to locations in memory (e.g., memory 260 and read only memory (ROM) 250) or to other circuits or devices.

The AP 112 may include at least one network port 270. The network port 270 may be configured to couple to a wired network and provide a plurality of devices, such as UEs 106, access to the Internet. For example, the network port 270 (or an additional network port) may be configured to couple to a local network, such as a home network or an enterprise network. For example, port 270 may be an Ethernet port. The local network may provide connectivity to additional networks, such as the Internet.

The AP 112 may include at least one antenna 234, which may be configured to operate as a wireless transceiver and may be further configured to communicate with UE 106 via wireless communication circuitry 230. The antenna 234 communicates with the wireless communication circuitry 230 via communication chain 232. Communication chain 232 may include one or more receive chains, one or more transmit chains or both. The wireless communication circuitry 230 may be configured to communicate via Wi-Fi or WLAN, e.g., 802.11. The wireless communication circuitry 230 may also, or alternatively, be configured to communicate via various other wireless communication technologies, including, but not limited to, 5G NR, Long-Term Evolution (LTE), LTE Advanced (LTE-A), Global System for Mobile (GSM), Wideband Code Division Multiple Access (WCDMA), CDMA2000, etc., for example when the AP is co-located with a base station in case of a small cell, or in other instances when it may be desirable for the AP 112 to communicate via various different wireless communication technologies.

In some embodiments, as further described below, an AP 112 may be configured to perform methods for overhead reduction for multi-carrier beam selection and power control as further described herein.

Figure 3A:
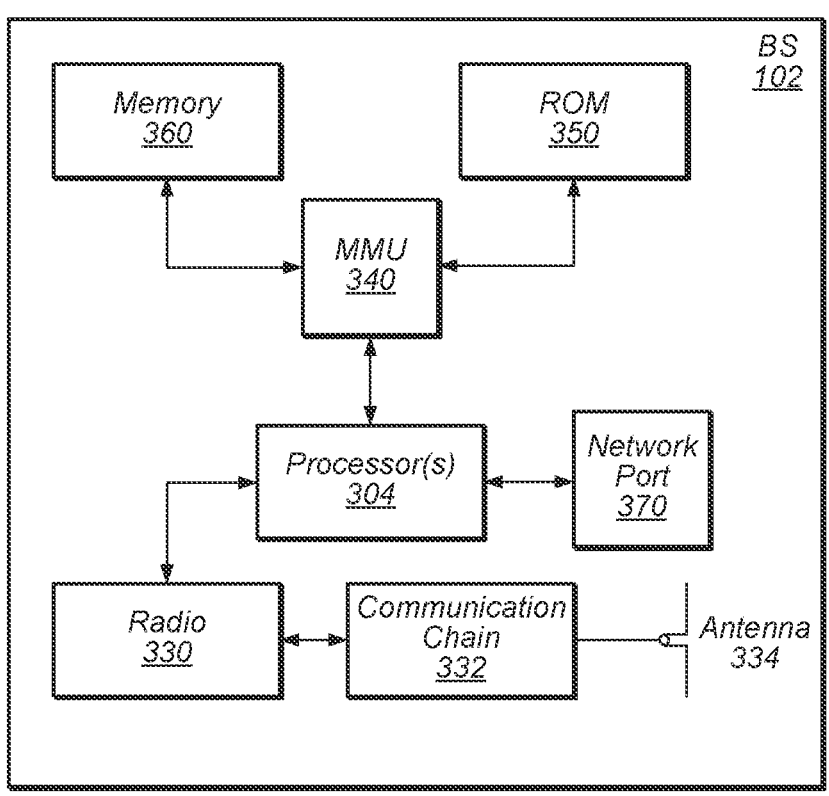
FIG. 3A illustrates an example block diagram of a BS according to some embodiments.

FIG. 3A: Block Diagram of a Base Station

FIG. 3A illustrates an example block diagram of a base station 102, according to some embodiments. It is noted that the base station of FIG. 3A is merely one example of a possible base station. As shown, the base station 102 may include processor(s) 304 which may execute program instructions for the base station 102. The processor(s) 304 may also be coupled to memory management unit (MMU) 340, which may be configured to receive addresses from the processor(s) 304 and translate those addresses to locations in memory (e.g., memory 360 and read only memory (ROM) 350) or to other circuits or devices.

The base station 102 may include at least one network port 370. The network port 370 may be configured to couple to a telephone network and provide a plurality of devices, such as UE devices 106, access to the telephone network as described above in FIGS. 1 and 2.

The network port 370 (or an additional network port) may also or alternatively be configured to couple to a cellular network, e.g., a core network of a cellular service provider. The core network may provide mobility related services and/or other services to a plurality of devices, such as UE devices 106. In some cases, the network port 370 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 334, and possibly multiple antennas. The at least one antenna 334 may be configured to operate as a wireless transceiver and may be further configured to communicate with UE devices 106 via radio 330. The antenna 334 communicates with the radio 330 via communication chain 332. Communication chain 332 may be a receive chain, a transmit chain or both. The radio 330 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 304 of the base station 102 may be configured to implement or support implementation of part or all of the methods described herein, e.g., by executing program instructions stored on a memory medium (e.g., a non-transitory computer-readable memory medium). Alternatively, the processor 304 may be configured as a programmable hardware element, such as an FPGA (Field Programmable Gate Array), or as an ASIC (Application Specific Integrated Circuit), or a combination thereof. Alternatively (or in addition) the processor 304 of the BS 102, in conjunction with one or more of the other components 330, 332, 334, 340, 350, 360, 370 may be configured to implement or support implementation of part or all of the features described herein.

In addition, as described herein, processor(s) 304 may be comprised of one or more processing elements. In other words, one or more processing elements may be included in processor(s) 304. Thus, processor(s) 304 may include one or more integrated circuits (ICs) that are configured to perform the functions of processor(s) 304. In addition, each integrated circuit may include circuitry (e.g., first circuitry, second circuitry, etc.) configured to perform the functions of processor(s) 304.

Further, as described herein, radio 330 may be comprised of one or more processing elements. In other words, one or more processing elements may be included in radio 330. Thus, radio 330 may include one or more integrated circuits (ICs) that are configured to perform the functions of radio 330. In addition, each integrated circuit may include circuitry (e.g., first circuitry, second circuitry, etc.) configured to perform the functions of radio 330.

Figure 3B:
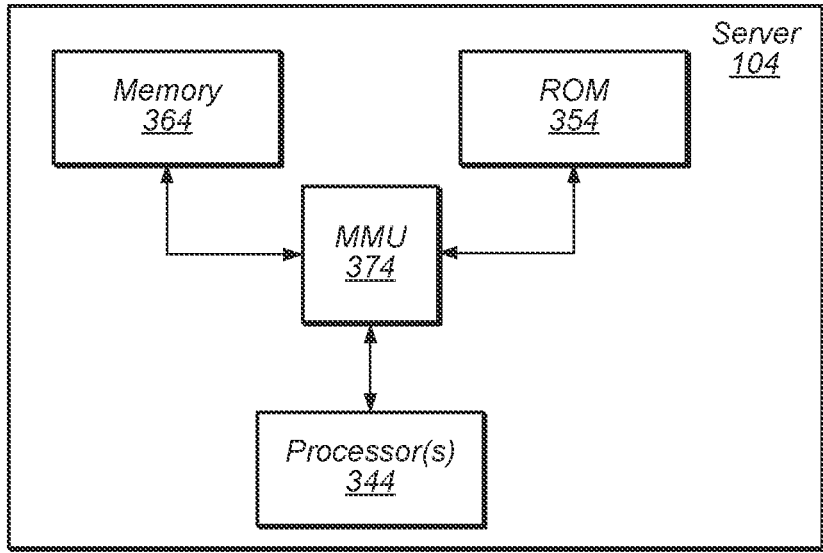
FIG. 3B illustrates an example block diagram of a server according to some embodiments.

FIG. 3B: Block Diagram of a Server

FIG. 3B illustrates an example block diagram of a server 104, according to some embodiments. It is noted that the server of FIG. 3B is merely one example of a possible server. As shown, the server 104 may include processor(s) 344 which may execute program instructions for the server 104. The processor(s) 344 may also be coupled to memory management unit (MMU) 374, which may be configured to receive addresses from the processor(s) 344 and translate those addresses to locations in memory (e.g., memory 364 and read only memory (ROM) 354) or to other circuits or devices.

The server 104 may be configured to provide a plurality of devices, such as base station 102, UE devices 106, and/or UTM 108, access to network functions, e.g., as further described herein.

In some embodiments, the server 104 may be part of a radio access network, such as a 5G New Radio (5G NR) radio access network. In some embodiments, the server 104 may be connected to a legacy evolved packet core (EPC) network and/or to a NR core (NRC) network.

As described further subsequently herein, the server 104 may include hardware and software components for implementing or supporting implementation of features described herein. The processor 344 of the server 104 may be configured to implement or support implementation of part or all of the methods described herein, e.g., by executing program instructions stored on a memory medium (e.g., a non-transitory computer-readable memory medium). Alternatively, the processor 344 may be configured as a programmable hardware element, such as an FPGA (Field Programmable Gate Array), or as an ASIC (Application Specific Integrated Circuit), or a combination thereof. Alternatively (or in addition) the processor 344 of the server 104, in conjunction with one or more of the other components 354, 364, and/or 374 may be configured to implement or support implementation of part or all of the features described herein.

In addition, as described herein, processor(s) 344 may be comprised of one or more processing elements. In other words, one or more processing elements may be included in processor(s) 344. Thus, processor(s) 344 may include one or more integrated circuits (ICs) that are configured to perform the functions of processor(s) 344. In addition, each integrated circuit may include circuitry (e.g., first circuitry, second circuitry, etc.) configured to perform the functions of processor(s) 344.

Figure 4:
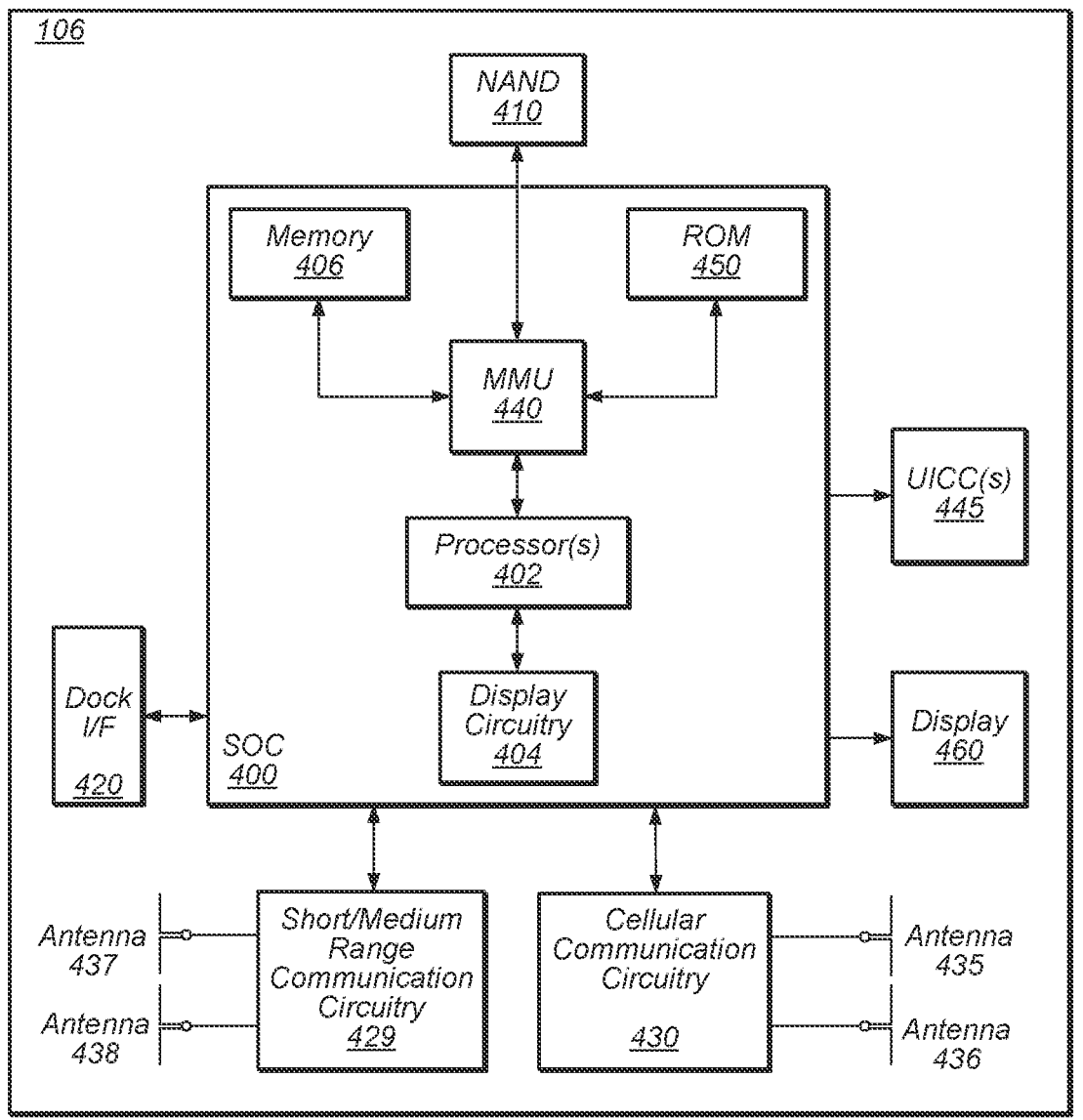
FIG. 4 illustrates an example block diagram of a UE according to some embodiments.

FIG. 4: Block Diagram of a UE

FIG. 4 illustrates an example simplified block diagram of a communication device 106, according to some embodiments. It is noted that the block diagram of the communication device of FIG. 4 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet, an unmanned aerial vehicle (UAV), a UAV controller (UAC) and/or a combination of devices, among other devices. As shown, the communication device 106 may include a set of components 400 configured to perform core functions. For example, this set of components may be implemented as a system on chip (SOC), which may include portions for various purposes. Alternatively, this set of components 400 may be implemented as separate components or groups of components for the various purposes. The set of components 400 may be coupled (e.g., communicatively; directly or indirectly) to various other circuits of the communication device 106.

For example, the communication device 106 may include various types of memory (e.g., including NAND flash 410), an input/output interface such as connector I/F 420 (e.g., for connecting to a computer system; dock; charging station; input devices, such as a microphone, camera, keyboard; output devices, such as speakers; etc.), the display 460, which may be integrated with or external to the communication device 106, and cellular communication circuitry 430 such as for 5G NR, LTE, GSM, etc., and short to medium range wireless communication circuitry 429 (e.g., Bluetooth™ and WLAN circuitry). In some embodiments, communication device 106 may include wired communication circuitry (not shown), such as a network interface card, e.g., for Ethernet.

The cellular communication circuitry 430 may couple (e.g., communicatively; directly or indirectly) to one or more antennas, such as antennas 435 and 436 as shown. The short to medium range wireless communication circuitry 429 may also couple (e.g., communicatively; directly or indirectly) to one or more antennas, such as antennas 437 and 438 as shown. Alternatively, the short to medium range wireless communication circuitry 429 may couple (e.g., communicatively; directly or indirectly) to the antennas 435 and 436 in addition to, or instead of, coupling (e.g., communicatively; directly or indirectly) to the antennas 437 and 438. The short to medium range wireless communication circuitry 429 and/or cellular communication circuitry 430 may include multiple receive chains and/or multiple transmit chains for receiving and/or transmitting multiple spatial streams, such as in a multiple-input multiple output (MIMO) configuration.

In some embodiments, as further described below, cellular communication circuitry 430 may include dedicated receive chains (including and/or coupled to, e.g., communicatively; directly or indirectly. dedicated processors and/or radios) for multiple RATs (e.g., a first receive chain for LTE and a second receive chain for 5G NR). In addition, in some embodiments, cellular communication circuitry 430 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 460 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 445 that include SIM (Subscriber Identity Module) functionality, such as one or more UICC(s) (Universal Integrated Circuit Card(s)) cards 445. Note that the term "SIM" or "SIM entity" is intended to include any of various types of SIM implementations or SIM functionality, such as the one or more UICC(s) cards 445, one or more eUICCs, one or more eSIMs, either removable or embedded, etc. In some embodiments, the UE 106 may include at least two SIMs. Each SIM may execute one or more SIM applications and/or otherwise implement SIM functionality. Thus, each SIM may be a single smart card that may be embedded, e.g., may be soldered onto a circuit board in the UE 106, or each SIM may be implemented as a removable smart card. Thus, the SIM(s) may be one or more removable smart cards (such as UICC cards, which are sometimes referred to as "SIM cards"), and/or the SIMs 410 may be one or more embedded cards (such as embedded UICCs (eUICCs), which are sometimes referred to as "eSIMs" or "eSIM cards"). In some embodiments (such as when the SIM(s) include an eUICC), one or more of the SIM(s) may implement embedded SIM (eSIM) functionality; in such an embodiment, a single one of the SIM(s) may execute multiple SIM applications. Each of the SIMs may include components such as a processor and/or a memory; instructions for performing SIM/eSIM functionality may be stored in the memory and executed by the processor. In some embodiments, the UE 106 may include a combination of removable smart cards and fixed/non-removable smart cards (such as one or more eUICC cards that implement eSIM functionality), as desired. For example, the UE 106 may comprise two embedded SIMs, two removable SIMs, or a combination of one embedded SIMs and one removable SIMs. Various other SIM configurations are also contemplated.

As noted above, in some embodiments, the UE 106 may include two or more SIMs.

The inclusion of two or more SIMs in the UE 106 may allow the UE 106 to support two different telephone numbers and may allow the UE 106 to communicate on corresponding two or more respective networks. For example, a first SIM may support a first RAT such as LTE, and a second SIM support a second RAT such as 5G NR. Other implementations and RATs are of course possible. In some embodiments, when the UE 106 comprises two SIMs, the UE 106 may support Dual SIM Dual Active (DSDA) functionality. The DSDA functionality may allow the UE 106 to be simultaneously connected to two networks (and use two different RATs) at the same time, or to simultaneously maintain two connections supported by two different SIMs using the same or different RATs on the same or different networks. The DSDA functionality may also allow the UE 106 to simultaneously receive voice calls or data traffic on either phone number. In certain embodiments the voice call may be a packet switched communication. In other words, the voice call may be received using voice over LTE (VoLTE) technology and/or voice over NR (VoNR) technology. In some embodiments, the UE 106 may support Dual SIM Dual Standby (DSDS) functionality. The DSDS functionality may allow either of the two SIMs in the UE 106 to be on standby waiting for a voice call and/or data connection. In DSDS, when a call/data is established on one SIM, the other SIM is no longer active. In some embodiments, DSDx functionality (either DSDA or DSDS functionality) may be implemented with a single SIM (e.g., a eUICC) that executes multiple SIM applications for different carriers and/or RATs.

As shown, the SOC 400 may include processor(s) 402, which may execute program instructions for the communication device 106 and display circuitry 404, which may perform graphics processing and provide display signals to the display 460. The processor(s) 402 may also be coupled to memory management unit (MMU) 440, which may be configured to receive addresses from the processor(s) 402 and translate those addresses to locations in memory (e.g., memory 406, read only memory (ROM) 450, NAND flash memory 410) and/or to other circuits or devices, such as the display circuitry 404, short to medium range wireless communication circuitry 429, cellular communication circuitry 430, connector I/F 420, and/or display 460. The MMU 440 may be configured to perform memory protection and page table translation or set up. In some embodiments, the MMU 440 may be included as a portion of the processor(s) 402.

As noted above, the communication device 106 may be configured to communicate using wireless and/or wired communication circuitry. The communication device 106 may be configured to perform methods for beam failure recovery based on a unified TCI framework, e.g., in 5G NR systems and beyond, as further described herein.

As described herein, the communication device 106 may include hardware and software components for implementing the above features for a communication device 106 to communicate a scheduling profile for power savings to a network. The processor 402 of the communication device 106 may be configured to implement part or all of the features described herein, e.g., by executing program instructions stored on a memory medium (e.g., a non-transitory computer-readable memory medium). Alternatively (or in addition), processor 402 may be configured as a programmable hardware element, such as an FPGA (Field Programmable Gate Array), or as an ASIC (Application Specific Integrated Circuit). Alternatively (or in addition) the processor 402 of the communication device 106, in conjunction with one or more of the other components 400, 404, 406, 410, 420, 429, 430, 440, 445, 450, 460 may be configured to implement part or all of the features described herein.

In addition, as described herein, processor 402 may include one or more processing elements. Thus, processor 402 may include one or more integrated circuits (ICs) that are configured to perform the functions of processor 402. In addition, each integrated circuit may include circuitry (e.g., first circuitry, second circuitry, etc.) configured to perform the functions of processor(s) 402.

Further, as described herein, cellular communication circuitry 430 and short to medium range wireless communication circuitry 429 may each include one or more processing elements. In other words, one or more processing elements may be included in cellular communication circuitry 430 and, similarly, one or more processing elements may be included in short to medium range wireless communication circuitry 429. Thus, cellular communication circuitry 430 may include one or more integrated circuits (ICs) that are configured to perform the functions of cellular communication circuitry 430. In addition, each integrated circuit may include circuitry (e.g., first circuitry, second circuitry, etc.) configured to perform the functions of cellular communication circuitry 430. Similarly, the short to medium range wireless communication circuitry 429 may include one or more ICs that are configured to perform the functions of short to medium range wireless communication circuitry 429. In addition, each integrated circuit may include circuitry (e.g., first circuitry, second circuitry, etc.) configured to perform the functions of short to medium range wireless communication circuitry 429.

Figure 5:
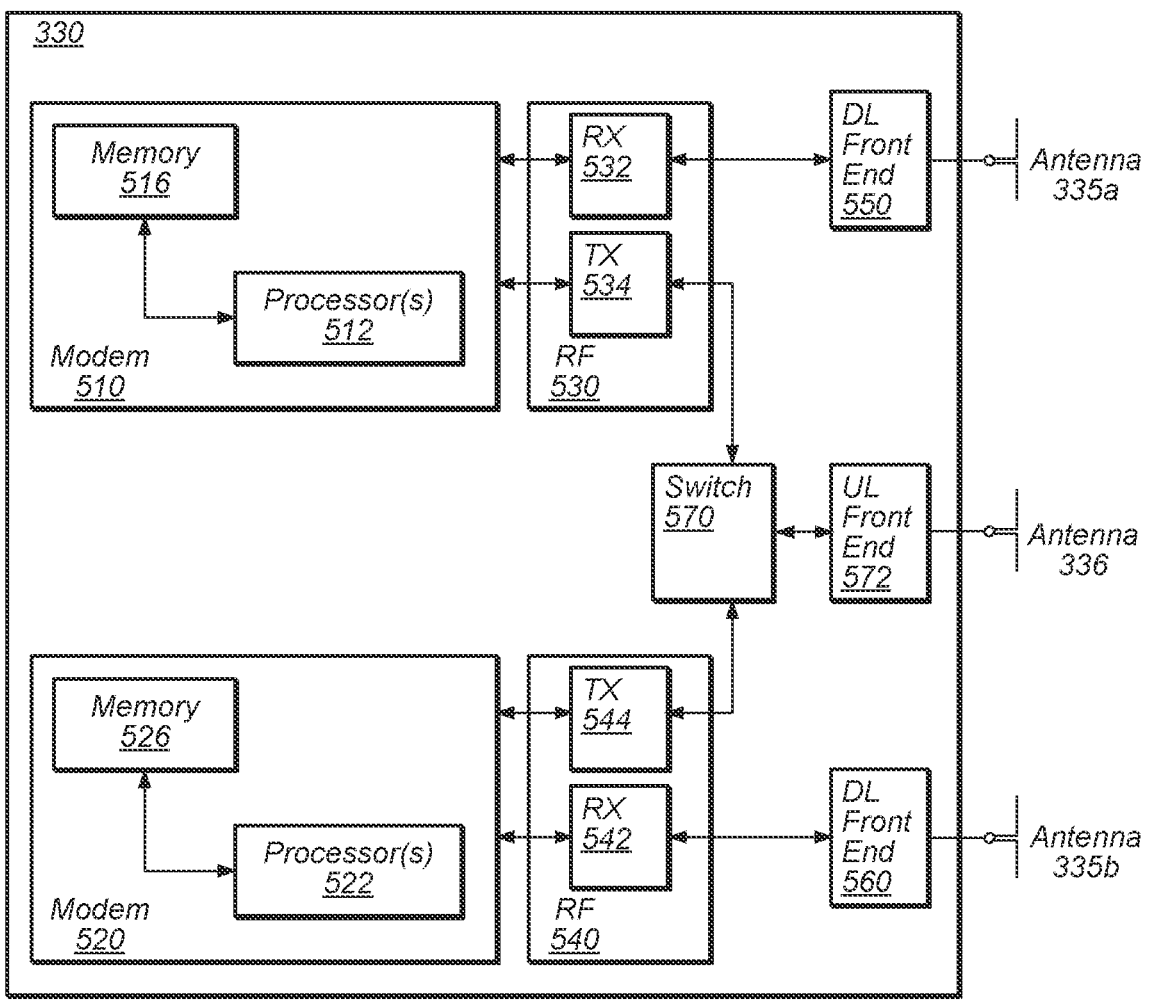
FIG. 5 illustrates an example block diagram of cellular communication circuitry, according to some embodiments.

FIG. 5: Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit. According to embodiments, cellular communication circuitry 530, which may be cellular communication circuitry 430, may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 530 may couple (e.g., communicatively; directly or indirectly) to one or more antennas, such as antennas 435*a-b* and 436 as shown (in FIG. 4). In some embodiments, cellular communication circuitry 530 may include dedicated receive chains (including and/or coupled to, e.g., communicatively; directly or indirectly. dedicated processors and/or radios) for multiple RATs (e.g., a first receive chain for LTE and a second receive chain for 5G NR). For example, as shown in FIG. 5, cellular communication circuitry 530 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335*a*.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335*b*.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 530 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 530 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

In some embodiments, the cellular communication circuitry 530 may be configured to perform methods beam failure recovery based on a unified TCI framework, e.g., in 5G NR systems and beyond, as further described herein.

As described herein, the modem 510 may include hardware and software components for implementing the above features or for time division multiplexing UL data for NSA NR operations, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In addition, as described herein, processors 512 may include one or more processing elements. Thus, processors 512 may include one or more integrated circuits (ICs) that are configured to perform the functions of processors 512. In addition, each integrated circuit may include circuitry (e.g., first circuitry, second circuitry, etc.) configured to perform the functions of processors 512.

As described herein, the modem 520 may include hardware and software components for implementing the above features for communicating a scheduling profile for power savings to a network, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

In addition, as described herein, processors 522 may include one or more processing elements. Thus, processors 522 may include one or more integrated circuits (ICs) that are configured to perform the functions of processors 522. In addition, each integrated circuit may include circuitry (e.g., first circuitry, second circuitry, etc.) configured to perform the functions of processors 522.

Figure 6A:
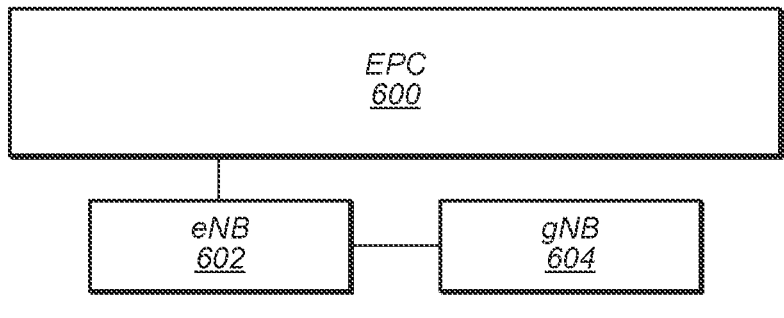
FIG. 6A illustrates an example of connections between an EPC network, an LTE base station (eNB), and a 5G NR base station (gNB).
Figure 6B:
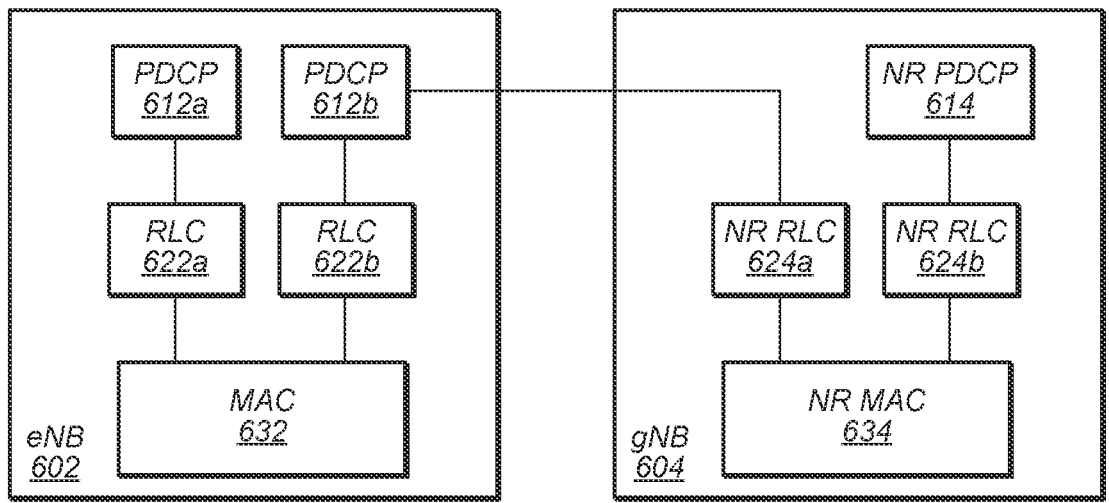
FIG. 6B illustrates an example of a protocol stack for an eNB and a gNB.

FIGS. 6A and 6B: 5G NR Architecture with LTE

In some implementations, fifth generation (5G) wireless communication will initially be deployed concurrently with current wireless communication standards (e.g., LTE). For example, dual connectivity between LTE and 5G new radio (5G NR or NR) has been specified as part of the initial deployment of NR. Thus, as illustrated in FIGS. 6A-B, evolved packet core (EPC) network 600 may continue to communicate with current LTE base stations (e.g., eNB 602). In addition, eNB 602 may be in communication with a 5G NR base station (e.g., gNB 604) and may pass data between the EPC network 600 and gNB 604. Thus, EPC network 600 may be used (or reused) and gNB 604 may serve as extra capacity for UEs, e.g., for providing increased downlink throughput to UEs. In other words, LTE may be used for control plane signaling and NR may be used for user plane signaling. Thus, LTE may be used to establish connections to the network and NR may be used for data services.

FIG. 6B illustrates a proposed protocol stack for eNB 602 and gNB 604. As shown, eNB 602 may include a medium access control (MAC) layer 632 that interfaces with radio link control (RLC) layers 622a-b. RLC layer 622a may also interface with packet data convergence protocol (PDCP) layer 612a and RLC layer 622b may interface with PDCP layer 612b. Similar to dual connectivity as specified in LTE-Advanced Release 12, PDCP layer 612a may interface via a master cell group (MCG) bearer with EPC network 600 whereas PDCP layer 612b may interface via a split bearer with EPC network 600.

Additionally, as shown, gNB 604 may include a MAC layer 634 that interfaces with RLC layers 624a-b. RLC layer 624a may interface with PDCP layer 612b of eNB 602 via an $X_2$ interface for information exchange and/or coordination (e.g., scheduling of a UE) between eNB 602 and gNB 604. In addition, RLC layer 624b may interface with PDCP layer 614. Similar to dual connectivity as specified in LTE-Advanced Release 12, PDCP layer 614 may interface with EPC network 600 via a secondary cell group (SCG) bearer. Thus, eNB 602 may be considered a master node (MeNB) while gNB 604 may be considered a secondary node (SgNB). In some scenarios, a UE may be required to maintain a connection to both an MeNB and a SgNB. In such scenarios, the MeNB may be used to maintain a radio resource control (RRC) connection to an EPC while the SgNB may be used for capacity (e.g., additional downlink and/or uplink throughput).

Figure 7:
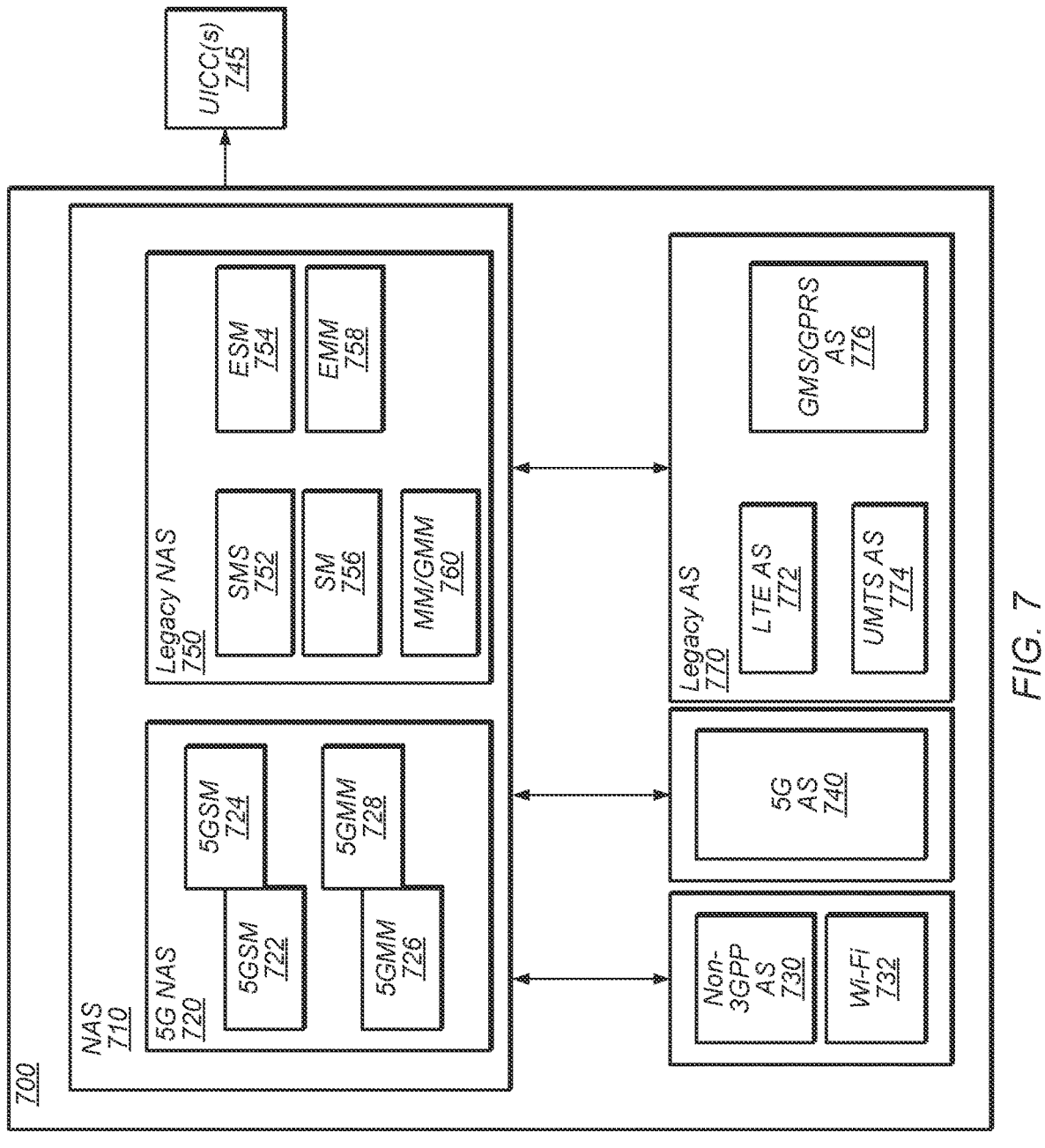
FIG. 7 illustrates an example of a baseband processor architecture for a UE, according to some embodiments.

FIG. 7: UE Baseband Processor Architecture

FIG. 7 illustrates an example of a baseband processor architecture for a UE (e.g., such as UE 106), according to some embodiments. The baseband processor architecture 700 described in FIG. 7 may be implemented on one or more radios (e.g., radios 329 and/or 330 described above) or modems (e.g., modems 510 and/or 520) as described above. As shown, the non-access stratum (NAS) 710 may include a 5G NAS 720 and a legacy NAS 750. The legacy NAS 750 may include a communication connection with a legacy access stratum (AS) 770. The 5G NAS 720 may include communication connections with both a 5G AS 740 and a non-3GPP AS 730 and Wi-Fi AS 732. The 5G NAS 720 may include functional entities associated with both access stratums. Thus, the 5G NAS 720 may include multiple 5G MM entities 726 and 728 and 5G session management (SM) entities 722 and 724. The legacy NAS 750 may include functional entities such as short message service (SMS) entity 752, evolved packet system (EPS) session management (ESM) entity 754, session management (SM) entity 756, EPS mobility management (EMM) entity 758, and mobility management (MM)/GPRS mobility management (GMM) entity 760. In addition, the legacy AS 770 may include functional entities such as LTE AS 772, UMTS AS 774, and/or GSM/GPRS AS 776.

Thus, the baseband processor architecture 700 allows for a common 5G-NAS for both 5G cellular and non-cellular (e.g., non-3GPP access). Note that as shown, the 5G MM may maintain individual connection management and registration management state machines for each connection. Additionally, a device (e.g., UE 106) may register to a single PLMN (e.g., 5G CN) using 5G cellular access as well as non-cellular access. Further, it may be possible for the device to be in a connected state in one access and an idle state in another access and vice versa. Finally, there may be common 5G-MM procedures (e.g., registration, de-registration, identification, authentication, as so forth) for both accesses.

Note that in various embodiments, one or more of the above described functional entities of the 5G NAS and/or 5G AS may be configured to perform methods overhead reduction for multi-carrier beam selection and power control, e.g., as further described herein.

Figure 8:
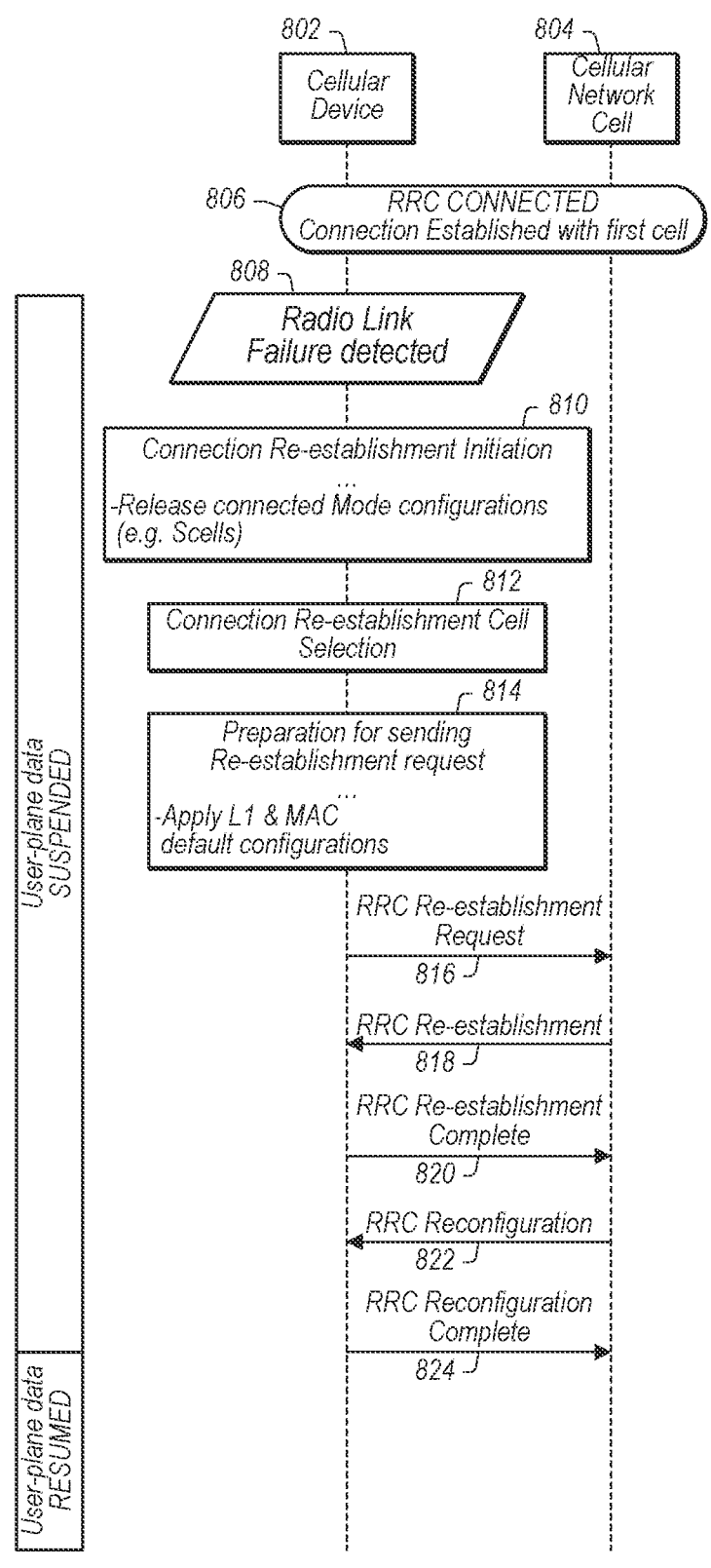
FIG. 8 illustrates a typical connection re-establishment procedure in response to a radio link failure (RLF), according to some embodiments.

FIG. 8—Connection Reestablishment Procedure in Response to a Radio Link Failure In the scenario in which a user equipment (UE) has established a connection with the network (e.g., a base station or evolved node-B (eNB)/next-generation node-B (gNB)), the UE may be considered to be in a radio resource control (RRC) connected mode. However, if the UE experiences a radio link failure (RLF), the UE may execute a connection re-establishment procedure. More specifically, if a suitable cell is found during connection re-establishment cell selection, the UE may exchange sequences of over-the-air messages with the cellular network to resume the connection. For example, FIG. 8 illustrates a connection re-establishment procedure in response to a radio link failure (RLF), according to some embodiments.

A UE may experience a RLF due to various physical layer issues, expiry of one or more timers (e.g., T310 timer), or if the UE has reached a maximum number of random access reconnection attempts. More specifically, some UEs may experience radio link failures due to temporary out-of-coverage scenarios in which the UE may enter an area having minimal cellular coverage. Accordingly, the minimal cellular coverage (e.g., minimal carrier signal strength) may result in the primary serving cell "Pcell" being lost during this time. For example, some UEs may experience this loss of the Pcell due to entering an elevator, going into house basement, or entering a tunnel, among other examples. During this period of connection reestablishment, the UE user-plane data transfer with the network may be suspended.

Once the temporary out-of-coverage scenario has been resolved (e.g., the user and/or UE has exited a house basement, evaluator, or tunnel), the UE may attempt to reconnect to the network. During the connection re-establishment cell selection procedure, the UE may re-select the same primary serving cell "Pcell" that it was previously using or camping on before it experienced the RLF. However, the UE may still have to perform appropriate connection re-establishment procedures which may be unnecessarily time consuming.

For example, as shown in FIG. 8, a cellular device 802 (e.g., a UE) may establish a connection with a first serving cell (e.g., a primary cell (PCell)) corresponding to a cellular network 804. Accordingly, the UE may be considered to be in an RRC Connected state 806 and may further experience or detect a radio link failure (RLF) 808 corresponding to issues discussed above. In 810, the UE may attempt to initiate a connection re-establishment with the network and further release some of the connected mode configurations (e.g., releasing secondary cells (Scells)). Moreover, after the UE has performed cell selection in 812, the UE may prepare to send a re-establishment request to the network by applying layer-1 (L1) and media access control (MAC) default configurations in 814. Accordingly, the UE and network may exchange RRC-messages such as a RRC re-establishment request 816 message, a RRC re-establishment 818 message, a RRC re-establishment complete 820 message, a RRC reconfiguration 822 message, and a RRC reconfiguration complete 824 message as part of corresponding operations as defined in appropriate 3GPP specifications and standards.

Additionally, the RRC Reconfiguration air-messages may provide and/or include complete or partial PCell and Scells configurations. Moreover, radio link control (RLC) and packet data convergence protocol (PDCP) radio-bearer re-establishment may be required in order to complete the connection re-establishment procedure. In new radio (NR), these operations could take up to 29 ms. For example, the operations involving the UE releasing its configurations and applying default configurations may take up to 3 ms, the RRC processing delay requirements for the RRC re-establishment complete 820 message may take up to 10 ms and the RRC processing delay requirements for the RRC re-configuration complete 824 message may take up to 16 ms for a total of approximately 29 ms.

In long term evolution (LTE), these operations could take up to 38 ms. For example, the operations involving the UE releasing its configurations and applying default configurations may take up to 3 ms, the RRC processing delay requirements for the RRC re-establishment complete 820 message may take up to 15 ms and the RRC processing delay requirements for the RRC re-configuration complete 824 message may take up to 20 ms for a total of approximately 38 ms. Accordingly, by performing the operations similar to the ones discussed above, the UE may experience an unnecessary time in which the UE user-plane data transfer with the network may be suspended.

Methods for Enhanced Radio Link Failure Recovery

Embodiments described herein provide mechanisms for enhanced radio link failure recovery. For example, some embodiments may involve a UE performing a connection re-establishment cell selection procedure in which the UE selects the same primary serving cell "Pcell" that it was connected to or camping on before a RLF was detected or occurred. Moreover, the UE may, as an alternative to re-performing the connection re-establishment procedure described above, stop the connection re-establishment procedure and send a special trigger to the network. According to some embodiments, the trigger may be RRC dedicated signaling air-message or layer-2 (L2) media access control (MAC) layer signaling. Additionally or alternatively, once the special trigger is successfully received by the network and results in a successful random access procedure, the connection may be considered to be re-established. Accordingly, the user-plane data transfer, which was initially suspended upon the occurrence of the RLF and loss of the Pcell connection, may be immediately resumed with the reception of the enhanced RLF recovery special trigger at the network. In other words, the user-plane data transfer may be able to be resumed at the point within the random access procedure described above in regard to FIG. 8 corresponding to the UE applying layer-1 (L1) and media access control (MAC) default configurations in 814. Accordingly, the UE may be able to re-establish its user-plane data transfer with the network without experiencing the 29 ms and 38 ms delays associated with performing the complete connection re-establishment procedures associated with 814-824 of FIG. 8.

Figure 9:
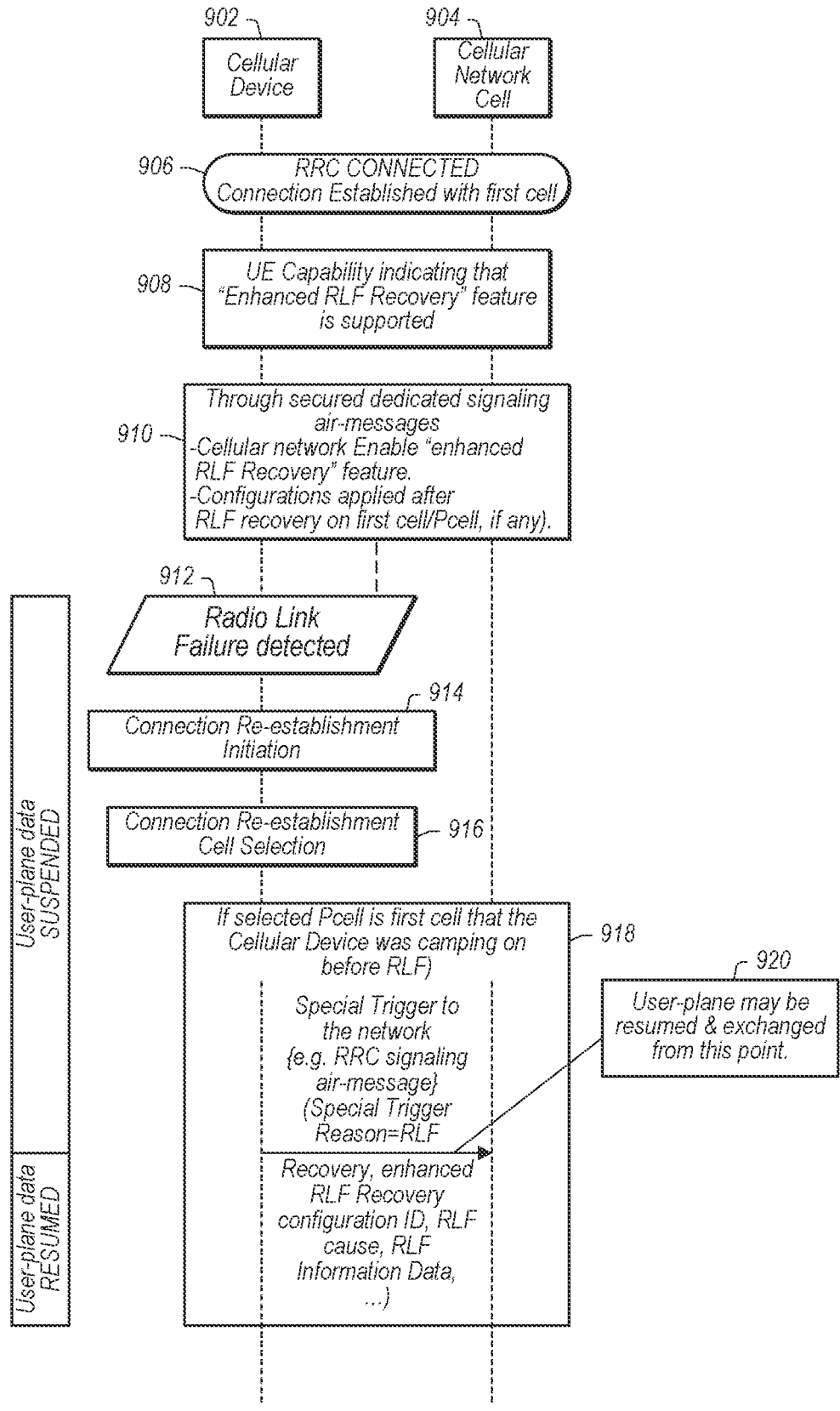
FIG. 9 is a high-level flow diagram of an enhanced RLF recovery procedure, according to some embodiments.

FIG. 9—Enhanced RLF Recovery Procedure

FIG. 9 illustrates a high-level flow diagram of an enhanced RLF recovery procedure, according to some embodiments.

Aspects of the method of FIG. 9 may be implemented by a wireless device, such as the UE(s) 106, in communication with one or more base stations (e.g., BS 102) as illustrated in and described with respect to the Figures, or more generally in conjunction with any of the computer systems or devices shown in the Figures, among other circuitry, systems, devices, elements, or components shown in the Figures, among other devices, as desired. For example, one or more processors (or processing elements) of the UE (e.g., processor(s) 402, baseband processor(s), processor(s) associated with communication circuitry, etc., among various possibilities) may cause the UE to perform some or all of the illustrated method elements. Note that while at least some elements of the method are described in a manner relating to the use of communication techniques and/or features associated with 3GPP specification documents, such description is not intended to be limiting to the disclosure, and aspects of the method may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method may operate as follows.

For example, as shown in FIG. 9, a cellular device 902 (e.g., a UE) may establish a connection with a cellular network cell (e.g., a first cell or PCell) 904 such that the UE is considered to be in an RRC connected state 906, according to some embodiments.

In 908, the UE 902 may indicate to the network 904 of its capability regarding enhanced RLF recovery. For example, the UE may transmit a radio resource control (RRC) message to the network indicating that its enhanced RLF recovery feature is supported, according to some embodiments. In some embodiments, the UE may indicate the support of this feature to the network through UE Capability Information (e.g., through non-access stratum (NAS) or RRC layers UE Capability dedicated signaling air-messages).

In 910, the network may, through secured dedicated signaling (e.g., over-the-air RRC messages) enable an enhanced RLF recovery feature in which connected mode configurations may be applied after RLF recovery on the Pcell (e.g., the first cell). Additionally or alternatively, it may be determined by the network how the scope of connected mode configurations (e.g., common or dedicated) are applied before the RLF such that the UE may re-use said configurations after the RLF recovery. Accordingly, the user-plane data transfer (e.g., at least on the Pcell/first cell) may be immediately resumed regardless of whether a partial set of the configurations (e.g., the network may send another RRC Reconfiguration over-the-air message after RLF recovery) has been applied or full set of configurations have been applied. According to some embodiments, the network may dynamically, within the RRC connection, enable and disable this enhanced RLF recovery feature in the UE through dedicated signaling air-messages (e.g., RRC dedicated signaling air messages).

According to some embodiments in which the feature is enabled, the network may configure the UE with a validity period for the enhanced RLF recovery configurations. More specifically, the validity period for the enhanced RLF recovery configurations may correspond to a time period in which the UE considers the corresponding configurations to be valid configurations. In other words, the corresponding configurations may only be validly applied by the UE if the validity period has not exceeded a threshold. According to some embodiments, the network may associate more than one enhanced RLF recovery configurations within the same Pcell such that each configuration may correspond to a different and distinct validity period. According to some embodiments, the network cell may indicate if this validity period feature is supported or not supported through System Information Broadcast messages parameters (e.g., SIB1 parameters).

In some embodiments, if the RRC Connected mode configurations configured before the RLF are not fully re-used by the UE after an RLF recovery, the network may configure the UE with the difference or delta of configurations (e.g., partial configurations) such that the current Pcell configurations or full (e.g., complete) connected mode configurations (common or dedicated), may be applied by the UE after the enhanced RLF recovery.

In 912, the UE may detect a radio link failure (RLF) potentially corresponding to a temporary out-of-coverage scenarios in which the UE has entered an area having minimal cellular coverage. Accordingly, this may result in the primary serving cell "Pcell" being lost during this time and before the connection is reestablished, the UE user-plane data transfer with the network may be suspended.

In 914, the UE may initiate a connection re-establishment procedure by performing cell selection 916. More specifically, the UE may select a suitable cell (e.g., a cell in which the UE may obtain normal service) based on idle mode measurements and certain cell selection criteria. For example, the cell may part of a selected or registered public land mobile network (PLMN) and the UE may scan radio-frequency (RF) channels in the NR or LTE radio interface (e.g., Evolved Universal Terrestrial Radio Access (E-UTRA)). According to some embodiments, the UE may only search for the strongest cell on each carrier frequency and once a suitable cell is found this cell may be selected by the UE. In other words, the UE may determine, via the connection reestablishment cell selection procedure, that the first cell (e.g., the Pcell to which it was camped on before the RLF) is a suitable RLF recovery candidate cell. According to some embodiments, the UE may then apply, in response to detecting the one or more RLFs and determining that the first cell is a suitable RLF recovery candidate cell, the configuration information for the first cell.

In 918, if the selected Pcell is the first cell that the UE was connected to or camping on previously, the UE may transmit a special trigger to the network (e.g., via RRC signaling over-the-air messaging), according to some embodiments. Accordingly, upon successful reception of the special trigger at the network, the user-plane data transfer may be resumed and such that data may once again be exchanged between the network and UE. Additionally or alternatively, the connection re-establishment special trigger transmitted from the UE to the network may provide the network with additional information. For example, the trigger may include an indication that the reason for the transmitted special trigger pertains to an enhanced RLF recovery procedure. In some embodiments, the trigger may include an identifier for the applied enhanced RLF recovery configuration in the scenario in which more than one was configured. Additionally or alternatively, the trigger may include information regarding the cause of the RLF as well as any further data that could be associated with the RLF (e.g., signal strength measurements) and/or any other information defined by 3GPP.

Accordingly, during connection re-establishment, if the selected cell was the previous Pcell the UE was camping on before the RLF occurred (which is typical in temporary out-of-coverage scenarios) and most of the RRC Connected mode configurations have been applied (and could be re-used) before the RLF, then the NR and LTE connection re-establishment operations could be reduced from 29 ms and 38 ms respectively to approximately two milliseconds which may correspond to the time required to initiate and transmit the enhanced RLF recovery trigger to the network. Moreover, this technique may be applied for different cellular technologies other than LTE and NR or any future cellular technologies.

Figure 10:
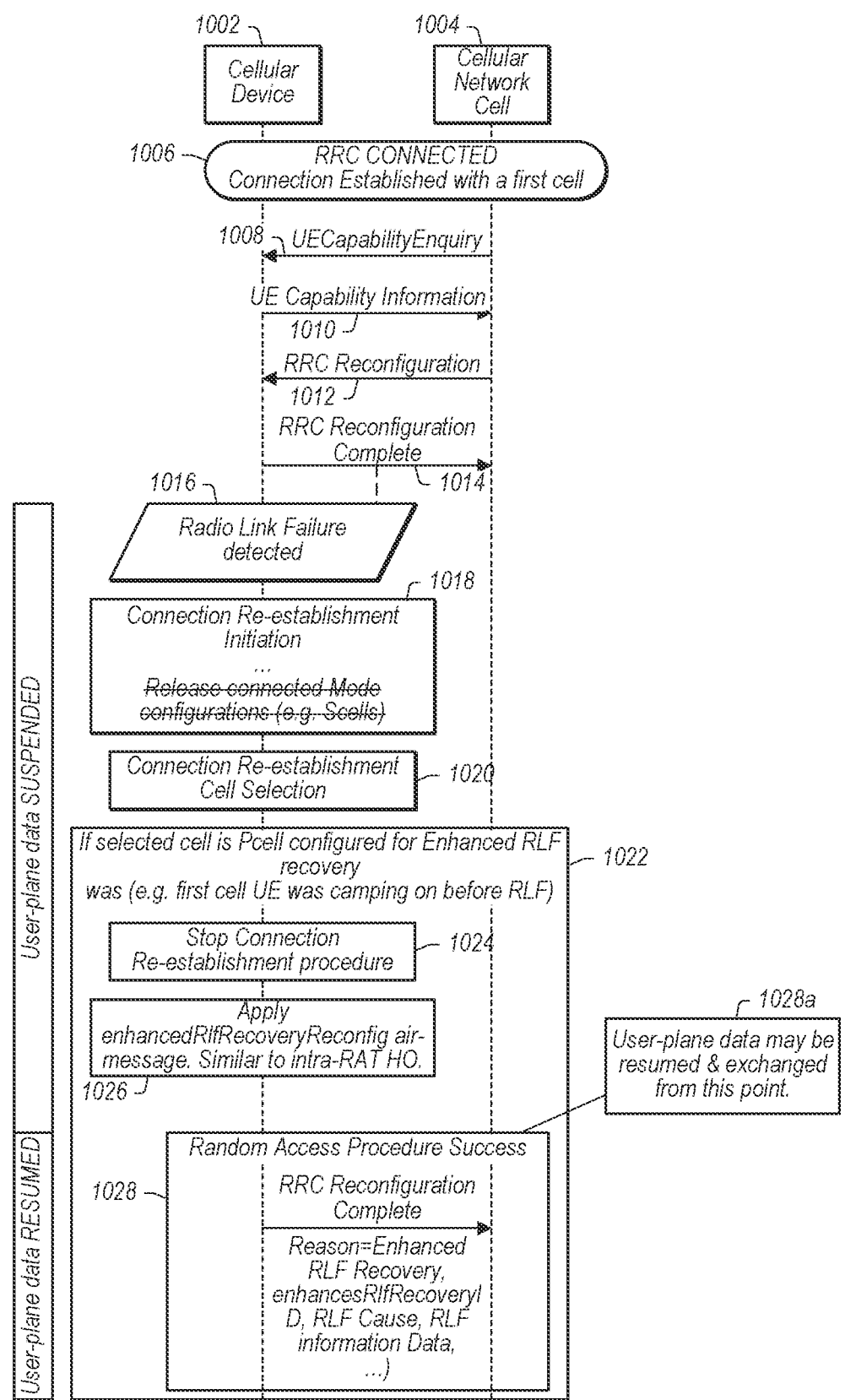
FIG. 10 illustrates an example flow diagram of an enhanced RLF recovery procedure using enhanced RLF recovery radio resource control (RRC) reconfiguration messages, according to some embodiments.

FIG. 10—Method for Enhanced RLF Recovery Through Utilization of Radio Resource Control (RRC) Reconfiguration Messages FIG. 10 illustrates an example flow diagram of an enhanced RLF recovery procedure using enhanced RLF recovery radio resource control (RRC) reconfiguration messages, according to some embodiments. More specifically, FIG. 10 illustrates a method in which the network may configure the UE with one or more enhanced RLF recovery RRC reconfiguration encoded over-the-air messages associated with candidate Pcells such as the current Pcell (e.g., previously connected to and/or camped on) or other candidate Pcells (e.g., neighboring cells) through a RRC Reconfiguration procedure.

Aspects of the method of FIG. 10 may be implemented by a wireless device, such as the UE(s) 106, in communication with one or more base stations (e.g., BS 102) as illustrated in and described with respect to the Figures, or more generally in conjunction with any of the computer systems or devices shown in the Figures, among other circuitry, systems, devices, elements, or components shown in the Figures, among other devices, as desired. For example, one or more processors (or processing elements) of the UE (e.g., processor(s) 402, baseband processor(s), processor(s) associated with communication circuitry, etc., among various possibilities) may cause the UE to perform some or all of the illustrated method elements. Note that while at least some elements of the method are described in a manner relating to the use of communication techniques and/or features associated with 3GPP specification documents, such description is not intended to be limiting to the disclosure, and aspects of the method may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method may operate as follows.

Similar to 902 as discussed above in regard to FIG. 9, in 1002 a cellular device 1002 (e.g., a UE) may establish a connection with a cellular network cell (e.g., a PCell/first cell) 1004 such that the UE is considered to be in an RRC connected state 1006, according to some embodiments.

In 1008, the network may transmit an inquiry to the UE regarding the UE's capability or support of enhanced RLF recovery procedures. In other words, the network may request information from the UE so that the network may assist the UE in performing said enhanced RLF recovery procedures (if the UE indicates it is capable) if a RLF is encountered.

In 1010, the UE may transmit, in response to receiving the inquiry from the network in 1008, a response to the network which may include information regarding the UE's capability or support of enhanced RLF recovery procedures. More specifically, the UE may indicate support of this feature through a RRC UECapabilityInformation air-message.

Furthermore, an example code block regarding the UE's capability information in 1010 may correspond to:

```
SEQUENCE{
...
enhancedRlfRecovery-ReconfiogSupport
{supported}, optional Need N,
...
}
```

In 1012 the network may, in response to receiving the UE's capability information, transmit one or more RRC reconfiguration messages to the UE in order to assist or prepare the UE for an enhanced recovery procedure upon encountering an RLF. For example, one or more enhanced RLF recovery RRC reconfiguration messages transmitted from the network to the UE may include a difference or delta of configurations (e.g., a partial configuration) from the current UE RRC Connected mode common or dedicated configurations. Moreover, the network may determine the content of the enhanced RLF recovery RRC reconfiguration. For example, the network may require the UE to re-use most of the RRC Connected mode configurations (e.g., common or dedicated) in which they would be applied before the RLF occurs. Accordingly, the message content may have minimal information due to the re-use of configurations and/or information elements (IEs) such as MobilityControlInformation IE in LTE or ReconfigurationWithSync IE in NR. Furthermore, information about the candidate enhanced RLF recovery Pcell, such as frequency and physical cell identity, may not be required for the enhanced RLF recovery RRC reconfiguration message for the current Pcell. In other words, this information may already be known to the UE and therefore including this information in the message may not be useful for the UE. Additionally or alternatively, the network may include other configurations up to complete full connected mode configurations. In some embodiments, a normal (e.g., a non-enhanced RLF recovery RRC reconfiguration message) RRC reconfiguration message may be received at any point in time during the RRC connected state. According to some embodiments, an example code block of the RRC reconfiguration message may correspond to:

```
SEQUENCE{
...
enhancedRlfRecoveryAddModList::=SEQUENCE(SIZE(1..
maxenhancedRlfecoveryCells)) OF
enhancedRlfRecoveryToAddMod
enhancedRlfRecoveryAddMod::=SEQUENCE{
enhancedRlfRecoveryId   enhancedRlfRecoveryid.
enhancedRlfRecoveryReconfig OCTET
STRING(CONTAINING RRCReconfiguration) OPTIONAL,-- Cond
validity   enhancedRlfRecoveryValidityperiod
OPTIONAL,--Cond enhancedRlfRecoveryAdd
...
}
...
}
```

In 1014 the UE may, in response to receiving the RRC reconfiguration message from the network, transmit a RRC reconfiguration complete message upon successful completion of the random access procedure.

In 1016, the UE may detect a radio link failure (RLF) potentially corresponding to a temporary out-of-coverage scenarios in which the UE has entered an area having minimal cellular coverage. Accordingly, this may result in the primary serving cell "Pcell" being lost during this time and before the connection is reestablished, the UE user-plane data transfer with the network may be suspended.

In 1018, the UE may initiate a connection re-establishment procedure. However, in contrast to the typical connection reestablishment shown in FIG. 8, the UE may not release the connected mode configurations (e.g., Scells) and proceed directly to cell selection 1020 which may involve a procedure similar to that of 916 from FIG. 9.

In 1022, if the connection re-establishment selected cell was one of the candidate enhanced RLF recovery primary serving cells (Pcells) (e.g., the same Pcell the UE was connected to or camping on before the RLF, the UE may stop the connection re-establishment procedure as indicated by 1024, apply the associated stored enhanced RLF recovery RRC Reconfiguration message in 1026, and send an RRC ReconfigurationComplete message accordingly in 1028. Accordingly, at this point in time in which the Random Access Procedure has been successful and the RRC Reconfiguration Complete message has been sent to the network, the user-plane data may be resumed. According to some embodiments, this procedure may be similar to an intra-RAT handover. In some embodiments, the Random Access configurations may be provided within the associated enhanced RLF recovery RRC reconfiguration message. Additionally or alternatively, if the Random Access configurations are not provided, the UE may use the Random Access configurations broadcast in the selected Pcell system information blocks (SIBs).

In some embodiments, the network may be able to dynamically enable and/or disable the enhanced RLF recovery feature through a new abstract syntax notation 1 (ASN.1) field in the dedicated RRC Reconfiguration air-message (e.g., the "enhancedRlfReconveryReconfigAddList" ASN.1 field). Moreover, the entries in the list for a candidate Enhanced RLF Recovery Pcell may include information such as an identifier (ID) for the enhanced RLF recovery configuration entry, according to some embodiments. Additionally or alternatively, the entries in the list for a candidate Enhanced RLF Recovery Pcell may include EnhancedRl-fRecoveryReconfig which may be an encoded RRC Reconfiguration message that could be applied if the connection re-establishment selected cell is included within this message. In some embodiments, the entries in the list for a candidate Enhanced RLF Recovery Pcell may include cell information such as frequency and physical cell ID which would be part of this message. For example, in NR, this cell information may be part of the ReconfigurationWithSync ASN.1 information element.

According to some embodiments, the entries in the list for a candidate Enhanced RLF Recovery Pcell may include a validity period corresponding to a time period for the configuration validity. More specifically, this validity period may start or be initiated after the RLF has been detected by the UE. If this period elapsed or expired (e.g., exceeded a threshold value), there may be different configurations options possible that are configurable by the network. For example, as one option, the UE may discard this configuration entry. Additionally or alternatively, the UE may apply a certain and/or minimal set of configurations that are defined by 3GPP specifications. For example, if the time elapsed since the RLF was detected by the UE is greater than the ValidityPeriod value but less than certain threshold, the UE may release one or more corresponding Scells and apply specific values and/or default values for other configurations. One advantage of this may be that the user-plane data transfer could be immediately resumed after sending a RRC Reconfiguration Complete message rather than having to wait for the next RRC Reconfiguration message to be received from the network (e.g., as is the case in the normal connection re-establishment procedure).

According to some embodiments, the network may configure the UE with multiple entries for the same candidate enhanced RLF recovery Pcell with different validity periods and content. For example, this may be advantageous in the scenario in which the network may require the UE to apply different configurations if the UE was unable to apply a configuration if the ValidityPeriod was exceeded by a value less than certain threshold. In other words, the UE may be able to apply configurations with smaller validity periods first and configurations with larger validity periods subsequently, according to some embodiments.

In some embodiments, the network may indicate through System Information Broadcast messages (e.g., SIB1 parameter,) if the enhanced RLF recovery feature is supported/allowed or not. Furthermore, in the RRC Reconfiguration-Complete message sent by the UE to the network for enhanced RLF recovery, the UE may include information such as a reason or indication for performing the enhanced RLF recovery procedure. Additionally or alternatively, the UE may include information regarding the ID of the applied enhanced RLF recovery configuration which may be required if the UE is configured with more than one enhanced RLF recovery configuration for the same Pcell.

In some embodiments, the UE may include information such as the cause of the RLF as well as any information or data regarding the RLF. Additionally or alternatively, the UE may include other information that may be defined by 3GPP specifications such as parameters ue-measurmentsAvailable and rlf-InfoAvailable. More specifically, the UE may indicate rlf-InfoAvailable in the RRC ReconfigurationComplete message. Accordingly, the network may, in response, trigger a UEInformationRequest or UEInformationResponse to retrieve a RLF report, which may include the cause of the RLF and/or other RLF-related information. Once the RRC Reconfiguration Complete message is received by the network, the connection may be considered re-established and the user-plane data transfer may be able to be resumed after the random access procedure successful completion or at the point within the random access procedure described above in regard to FIG. 8 corresponding to the UE applying layer-1 (L1) and media access control (MAC) default configurations in 814. Accordingly, the UE may be able to re-establish its user-plane data transfer with the network without experiencing the 29 ms and 38 ms delays associated with performing the complete connection re-establishment procedures associated with 814-824 from FIG. 8.

Figure 11:
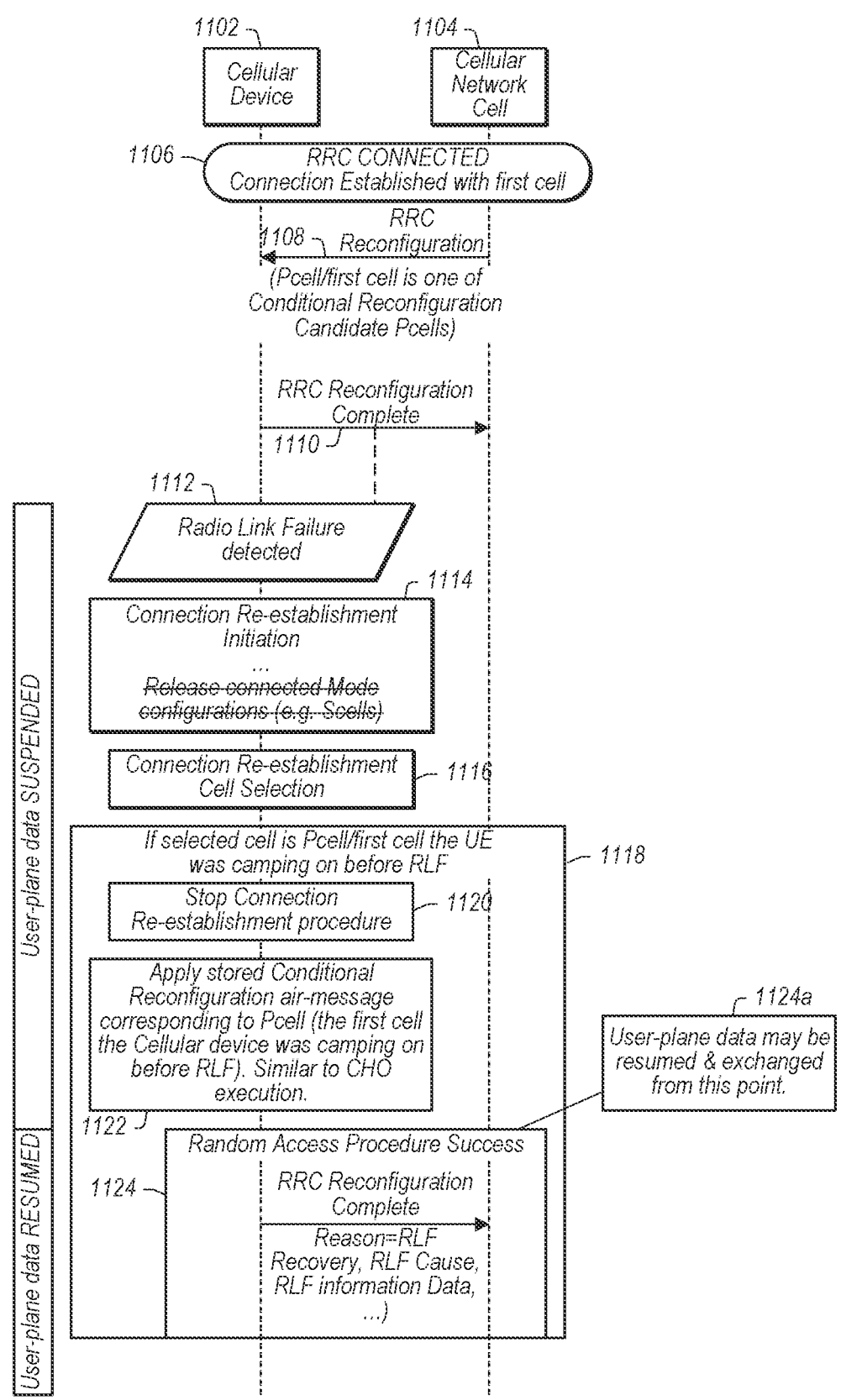
FIG. 11 illustrates an example flow diagram of an enhanced RLF recovery procedure by extending the existing framework used for conditional handovers (CHOs), according to some embodiments.

FIG. 11—Method for Enhanced RLF Recovery by Extending Existing Framework for Conditional Handovers (CHOs)

FIG. 11 illustrates an example flow diagram of an enhanced RLF recovery procedure by extending the existing framework used for conditional handovers (CHOs), according to some embodiments.

Aspects of the method of FIG. 11 may be implemented by a wireless device, such as the UE(s) 106, in communication with one or more base stations (e.g., BS 102) as illustrated in and described with respect to the Figures, or more generally in conjunction with any of the computer systems or devices shown in the Figures, among other circuitry, systems, devices, elements, or components shown in the Figures, among other devices, as desired. For example, one or more processors (or processing elements) of the UE (e.g., processor(s) 402, baseband processor(s), processor(s) associated with communication circuitry, etc., among various possibilities) may cause the UE to perform some or all of the illustrated method elements. Note that while at least some elements of the method are described in a manner relating to the use of communication techniques and/or features associated with 3GPP specification documents, such description is not intended to be limiting to the disclosure, and aspects of the method may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method may operate as follows.

As shown in FIG. 11 and similar to 902 as discussed above in regard to FIG. 9, a cellular device 1102 (e.g., a UE) may establish a connection with a cellular network cell (e.g., a PCell/first cell) 1104 such that the UE is considered to be in an RRC connected state 1106, according to some embodiments.

In 1108, the network may transmit one or more RRC reconfiguration messages to the UE in order to assist or prepare the UE for an enhanced recovery procedure upon encountering an RLF. According to some embodiments, the network may configure the UE with a list of candidate CHO PCells that the UE may use for triggering a CHO if certain configured conditions (e.g., conditional execution conditions) are fulfilled. Additionally or alternatively, the network may trigger CHO execution if the selected cell during the connection re-establishment cell selection procedure is one of the configured candidate CHO PCells. In some embodiments, the conditional execution conditions may be configured by the condExecutionCond ASN.1 field in NR. However, this may not be applicable if the CHO candidate Pcell is the current Pcell as fulfilling conditional execution conditions as described above may not be applied on the current Pcell. Accordingly, quick re-camping via CHO execution on the previous Pcell during the connection re-establishment procedure may not be possible.

According to some embodiments, the conditional executions conditions may correspond to a new event characterized similarly to the serving cell's signal quality becoming worse than a threshold (e.g., EventA2). This new event may be utilized rather than considering a neighboring cell's signal quality offset becoming better than the SpCell's signal quality (e.g., EventA3) and/or the SpCell's signal quality becoming worse than a first threshold and the neighboring cell signal quality becoming better than a second threshold (e.g., EventA5). Accordingly, fulfilling certain conditional execution conditions such as these may lead to early triggering of an RLF recovery procedure.

Additionally or alternatively, the network may configure the current Pcell (e.g., the first cell of which the UE may be connected to or camped on) such that it is one of the conditional reconfiguration candidate Pcells. In other words, the current Pcell may be also configured by the network as a CHO candidate Pcell. In some embodiments, a normal (e.g., a non-enhanced RLF recovery RRC reconfiguration message) RRC reconfiguration message may be received at any point in time during the RRC connected state. More specifically, an example code block of the RRC reconfiguration message may correspond to:

```
SEQUENCE{
...
CondReconfigToAddMod-r16 ::= SEQUENCE{
condReconfigId-r16.  CondReconfigId-r16,
condExecutionCond-r16 SEQUENCE (SIZE(1..2)) OF MeasId
OPTIONAL, --Cond
condReconfigAddPcell
condRRCReconfig-r16 OCTET STRING
(CONTAINING RRCReconfiguration) OPTIONAL, -
Cond condReconfigAdd
...
}
```

According to some embodiments, for master cell group (MCG) candidate Pcells other than the current Pcell or for secondary cell group (SCG) candidate Pscells, the condReconfigAddPcell field may be required to be present when a conditional reconfiguration ID is being added. In some embodiments, if the condReconfigAddPcell field is optional, need M. Additionally or alternatively, if the MCG candidate Pcell is equivalent to the current Pcell, the condReconfigAddPcell field may be absent.

In 1110 the UE may, in response to receiving the RRC reconfiguration message from the network, transmit a RRC reconfiguration complete message upon successful completion of the random access procedure.

In 1112, the UE may detect a radio link failure (RLF) potentially corresponding to a temporary out-of-coverage scenarios in which the UE has entered an area having minimal cellular coverage. Accordingly, this may result in the primary serving cell "Pcell" being lost during this time and before the connection is reestablished, the UE user-plane data transfer with the network may be suspended.

In 1114, the UE may initiate a connection re-establishment procedure. However, in contrast to the typical connection reestablishment shown in FIG. 8, the UE may not release the connected mode configurations (e.g., Scells) and proceed directly to cell selection 1116 which may involve a procedure similar to that of 916 from FIG. 9.

In 1118, if the connection re-establishment is initiated and the selected cell during connection re-establishment is one of the configured candidate CHO Pcells, then the UE may stop the connection re-establishment procedure in 1120 and apply the stored conditional reconfiguration message to the Pcell (e.g., the first cell the UE was connected to). Similar to a typical CHO execution, this may initiate a CHO procedure on the selected Pcell. Accordingly, the corresponding CHO may utilize normal intra-RAT handover procedures in which the applied RRC Reconfiguration message is the one stored in the UE for the corresponding selected conditional reconfiguration candidate Pcell that was previously configured by the network (e.g., the Pcell the UE was camping on or connected to before the RLF). In some embodiments, a NR capable UE may initiate the CHO execution by applying the associated CHO RRC Reconfiguration message set in condReconfig ASN.1 field associated with the previous Pcell CHO conditional reconfiguration entry.

In 1124, having successfully executed the CHO, the UE may transmit a RRC ReconfigurationComplete message to the network. Additionally or alternatively, the UE may include information in the RRC Reconfiguration Complete message to the network regarding whether or not the enhanced RLF recovery procedure was successful or achieved, the cause of the RLF and/or other information regarding the RLF or defined by 3GPP specifications (e.g., ue-measurmentsAvailable, rlf-InfoAvailable). In some embodiments and similar to other CHO RRC Reconfiguration messages, the RRC Reconfiguration message may include a mobility IE (e.g., MobilityControlInformation IE in LTE or reconfigurationWithSync IE in NR). Accordingly, a normal intra-RAT handover procedure may be followed for re-establishing the connection in which a random access procedure would be applied to re-access the cell. Moreover, once the RRC Reconfiguration Complete message is received by the network, the connection may be considered to be re-established. In other words, the user-plane data transfer may be able to be resumed at the point within the random access procedure described above in regard to FIG. 8 corresponding to the UE applying layer-1 (L1) and media access control (MAC) default configurations in 814. Accordingly, the UE may be able to re-establish its user-plane data transfer with the network without experiencing the 29 ms and 38 ms delays associated with performing the complete connection re-establishment procedures associated with 814-824.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Any of the methods described herein for operating a user equipment (UE) may be the basis of a corresponding method for operating a base station, by interpreting each message/signal X received by the UE in the downlink as message/signal X transmitted by the base station, and each message/signal Y transmitted in the uplink by the UE as a message/signal Y received by the base station.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus, comprising:
a processor configured to when executing instructions stored in a memory, perform operations comprising:
establishing a radio resource control (RRC) connection with a first cell of a cellular network;
transmitting, to the cellular network, signaling comprising an indication of enhanced radio link failure (RLF) recovery capability;
receiving, from the cellular network, one or more RRC messages comprising configuration information for RLF recovery on the first cell, wherein the configuration information comprises one or more enhanced RLF recovery configurations associated with one or more candidate cells, and wherein each of the one or more enhanced RLF recovery configurations correspond to one or more distinct validity periods configured by the cellular network;
detecting one or more RLFs corresponding to the first cell;
determining, via a connection reestablishment cell selection procedure, that the first cell is a suitable RLF recovery candidate cell of the one or more candidate cells;
applying, in response to detecting the one or more RLFs and determining that the first cell is a suitable RLF recovery candidate cell, the configuration information for the first cell;
transmitting, in response to applying the configuration information, signaling comprising a trigger indicating a RLF recovery to the cellular network; and
re-establishing the RRC connection with the cellular network using the configuration information.

2. The apparatus of claim 1,
wherein the first cell comprises a primary cell (PCell) to which a user equipment (UE) was connected to prior to the one or more RLFs.

3. The apparatus of claim 1,
wherein the one or more candidate cells comprise neighboring cells.

4. The apparatus of claim 1,
wherein the signaling comprising the trigger further comprises at least one of:
a reason for the enhanced RLF recovery,
an identifier of the applied configuration information,
a cause of the one or more RLFs,
information data regarding the one or more RLFs, and
a RLF report.

5. The apparatus of claim 1,
wherein the signaling comprising the trigger indicating the RLF recovery is transmitted via media access control (MAC) layer-2 (L2) signaling.

6. The apparatus of claim 1,
wherein upon successful reception of the trigger, user-plane data transfer between a user equipment (UE) and the cellular network is resumed.

7. A wireless device, comprising:
wireless communication circuitry; and
at least one processor coupled to the wireless communication circuitry and configured to cause the wireless device to:
establish a radio resource control (RRC) connection with a first cell of a network;
transmit, to the network, signaling comprising an indication of enhanced radio link failure (RLF) recovery capability;
receive, from the network, one or more RRC messages comprising conditional handover (CHO) configuration information for at least one or more candidate cells, wherein the CHO configuration information comprises one or more enhanced RLF recovery configurations associated with the one or more candidate cells, and wherein each of the one or more enhanced RLF recovery configurations correspond to one or more distinct validity periods configured by the cellular network;
detect one or more RLFs;
apply, in response to detecting the one or more RLFs, the CHO information to the one or more candidate cells; and
transmit, in response to applying the CHO configuration information, signaling comprising a trigger indicating a RLF recovery to the network;
re-establish the RRC connection with the network using the CHO configuration information.

8. The wireless device of claim 7,
wherein the first cell comprises a primary cell (PCell) to which the wireless device was connected to prior to the one or more RLFs which is configured by network as a candidate CHO cell.

9. The wireless device of claim 7,
wherein the one or more candidate cells are configured by the network as one or more candidate CHO cells.

10. The wireless device of claim 7,
wherein the signaling comprising the trigger further comprises at least one of:
a reason for the enhanced RLF recovery,
an identifier of the applied configuration information,
a cause of the one or more RLFs,
information data regarding the one or more RLFs, and
a RLF report.

11. The wireless device of claim 7,
wherein the signaling indicating support of the enhanced RLF recovery capability is transmitted via non-access stratum (NAS) signaling.

12. The wireless device of claim 7, wherein the signaling comprising the trigger indicating the RLF recovery is transmitted via dedicated RRC signaling.

13. The wireless device of claim 7, wherein the CHO configuration information comprises conditional execution conditions.

14. The wireless device of claim 13, wherein the conditional execution conditions are configured by the network in an Abstract Syntax Notation 1 (ASN.1) field.

15. An apparatus, comprising:

a processor configured to when executing instructions stored in a memory, perform operations comprising:

establishing a radio resource control (RRC) connection with a user equipment (UE);

transmitting, to the UE, a capability request message;

receiving, in response to the capability request message, signaling from the UE comprising an indication of an enhanced radio link failure (RLF) recovery capability;

transmitting, to the UE, one or more RRC messages comprising configuration information;

configuring one or more validity periods corresponding to the configuration information;

receiving, from the UE, signaling comprising a trigger indicating a RLF recovery; and re-establishing, in response to receiving the trigger, the RRC connection with the UE using the configuration information.

16. The apparatus of claim 15, wherein the operations further comprise:

dynamically enabling or disabling the enhanced RLF recovery capability of the UE.

17. The apparatus of claim 15, wherein the operations further comprise:

indicating via System Information Broadcast (SIB) messaging whether or not the enhanced RLF capability is allowed.

18. The apparatus of claim 15, wherein the signaling comprising the trigger indicating the RLF recovery is transmitted via dedicated RRC signaling.

19. The apparatus of claim 15, wherein the configuration information comprises conditional execution conditions.

20. The apparatus of claim 15, wherein the operations further comprise:

configuring the conditional execution conditions in an Abstract Syntax Notation 1 (ASN.1) field.

\* \* \* \* \*